3,321,513
PROCESS FOR THE OXIDATION OF [4-(1-HYDROXY-2-ALKYLIDENEALKYL)PHENOXY] ACETIC ACIDS TO [4-(2-ALKYLIDENEALKANOYL)PHENOXY] ACETIC ACIDS
Everett M. Schultz, Ambler, Pa., assignor to Merck & Co., Inc., Rahway, N.J., a corporation of New Jersey
No Drawing. Filed Dec. 17, 1963, Ser. No. 331,105
12 Claims. (Cl. 260—520)

This invention relates to a new method for preparing [4-(2-methylenealkanoyl)phenoxy]acetic acids. The products produced by the instant process are novel compounds and are claimed in my copending application Ser. No. 155,961, filed Dec. 6, 1961. As stated in my said copending application, the phenoxyacetic acids of the invention are effective diuretic and/or saluretic agents which are useful in the treatment of conditions resulting from an excessively high concentration of fluid in the body as, for example, in the treatment of edematous conditions resulting from congestive heart failure.

Broadly stated, the instant process comprises oxidizing a [4-(1-hydroxy-2-methylenealkyl)phenoxy]acetic acid under conditions suitable for converting the 1-hydroxy moiety to its oxo counterpart. The reactant in the process may be any unsubstituted or substituted [4-(1-hydroxy-2-methylenealkyl)phenoxy]acetic acid, with the only limitation on the nature of the substituents being the exclusion of groups that would undergo oxidation and produce undesired compounds. Any oxidizing agent capable of converting the hydroxy group to its oxo counterpart, may be employed in the process with good results.

More specifically, the instant process comprises the reaction of a [4-(1-hydroxy-2-methylenealkyl)phenoxy]-acetic acid with an oxidizing agent to prepare [4-(2-methylenealkanoyl)phenoxy]acetic acid according to the following equation:

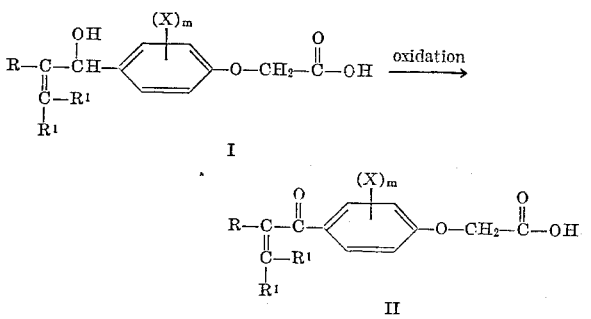

where R is a member selected from the group consisting of hydrogen, lower alkyl, e.g., methyl, ethyl, propyl, isopropyl, butyl, etc., trifluoromethyl substituted lower arkyl, e.g., 2,2,2-trifluoroethyl, etc., cycloalkyl, e.g., cyclopentyl, cyclohexyl, etc.,

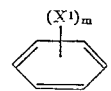

wherein $X^1$ represents a member selected from the group consisting of hydrogen, halogen, lower alkyl and lower alkoxy and

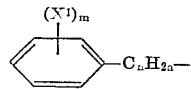

wherein $X^1$ is as defined above, $R^1$ is a member selected from the group consisting of hydrogen and lower alkyl, e.g., methyl, ethyl, propyl, butyl, etc., X is a member selected from the group consisting of hydrogen, halogen, lower alkyl, e.g., methyl, ethyl, isopropyl, etc., lower alkoxy, e.g., methoxy, ethoxy, propoxy, etc., and taken together two of the X radicals on adjacent carbon atoms of the benzene nucleus are joined to form an hydrocarbylene chain (i.e., a divalent organic radical composed solely of carbon and hydrogen) containing from three to four carbon atoms, e.g., trimethylene, tetramethylene, 1,3-butadienylene (i.e., —CH=CH—CH=CH—), etc., $m$, in each occurrence, is an integer having a value of 1–4 and $n$ is an integer having a value of 1–5.

A preferred embodiment of the invention comprises oxidizing a carbinol of the following formula

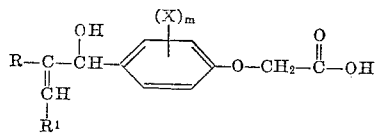

where R is lower alkyl, e.g., methyl, ethyl, etc., or substituted lower alkyl, such as trihalomethyl substituted lower alkyl, e.g., 2,2,2-trifluoroethyl, etc., $R^1$ is a member selected from the group consisting of hydrogen and lower alkyl, e.g., methyl, ethyl, etc., X is a member selected from the group consisting of hydrogen, halogen, e.g., chlorine, bromine, etc., lower alkyl, e.g., methyl, ethyl, etc., and taken together two X radicals on adjacent carbon atoms of the benzene ring may be combined to form a 1,3-butadienylene chain (i.e., —CH=CH—CH=CH—), and $m$ is an integer having a value of 1–2.

This invention also relates to the acid addition salts of the [4-(2-methylenealkanoyl)phenoxy]acetic acids produced by the instant process. In general, the salts are non-toxic pharmaceutically acceptable acid addition salts which are conveniently prepared by the reaction of the [4-(2-methylenealkanoyl)phenoxy]acetic acids with a base; suitable bases include, for example, the alkali and alkaline earth metal hydroxides, carbonates, etc., ammonia and amines, such as mono-, di- and tri-alkylamines, piperidine, etc. Generally, the base employed may be any reagent capable of combining with a monocarboxylic acid, provided the cation is non-toxic and may be ingested in the body system without causing adverse pharmacological side effects and without exhibiting properties which are incompatible with the diuretic activity of the phenoxyacetic acids. One skilled in the art will readily appreciate the wide variety of bases which can react with the phenoxyacetic acids of the invention to produce their corresponding non-toxic acid addition salts, and to the extent that the said salts do not mollify the desired diuretic effect attributable to the said acids they are considered as being the functional equivalent of the latter and as being within the scope of the invention.

It is to be understood that the instant process is not dependent upon the use of any precise oxidizing agent. Any reagent capable of converting the hydroxy group in the reactant depicted as I supra to its oxo counterpart, as illustrated by the product shown as II, is within the scope of the invention. The choice of a particular oxidizing substance is well within the purview of one skilled in the art and I do not wish to be limited to the use of any particular class of oxidants; however, I have found that chromium trioxide in an inert solvent, e.g., pyridine, and ortho-chloranil are particularly suitable oxidizing agents for the conversion of the 1-hydroxy carbinol group to the corresponding oxo derivative. The employment of temperatures above or below ambient is not necessary to the success of the reaction and oxidation proceeds most advantageously at room temperature. Any inert diluent (i.e., one which would not cause a rearrangement of the hydroxy group in the carbinol reactant or would not be oxidized under the conditions of the reaction) may be employed as a solvent in the instant process. I have employed chloroform, benzene and carbon tetrachloride as the reaction solvent with particularly good results.

The [4-(1-hydroxy - 2 - methylenealkyl)phenoxy]acetic acids (I) employed as reactants in the process may be prepared by the reaction of a vinylmagnesium halide with a (4-formylphenoxy)acetic acid according to the equation illustrated below:

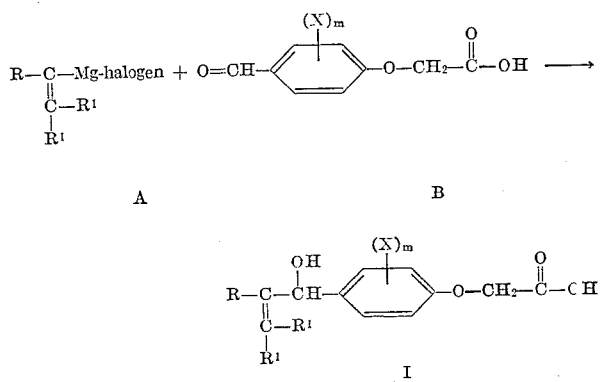

where R, $A^1$, X and $m$ are as defined above. The reaction may be conducted in the presence of an inert solvent, e.g., tetrahydrofuran, and at temperatures in the range of about 0–10° C. The (4-formylphenoxy)acetic acids (B) employed as the starting materials in the above-described synthesis are conveniently prepared by the reaction of phenol, or an appropriate nuclear substituted phenol, with hydrogen cyanide and hydrogen chloride (gas) in the presence of anhydrous aluminum chloride. The reaction is preferably conducted in an inert solvent, as for example in a benzene solution. Gatterman, Annalen, vol. 357, page 334. The 4-formylphenol thus produced is then reacted with 2-haloacetic acid in the presence of a base, and preferably the base and 2-haloacetic acid reactant are added gradually to the 4-formylphenol, or nuclear substituted 4-formylphenol, so that the reaction mixture becomes neither acidic or basic but is maintained substantially neutral. Suitable bases include, for example, a dilute solution of sodium hydroxide, etc. The vinylmagnesium halide reactants (A) are prepared by the reaction of magnesium metal with vinyl halide or an appropriately substituted vinyl halide.

The following examples illustrate the preparation of the [4-(2-methylenealkanoyl)phenoxy]alkanoic acids according to the process of the invention:

*Example 1*

6 g. of magnesium (0.25 mole) is placed in a flask equipped with a condenser, cooled with Dry Ice-acetone, a dropping funnel, a nitrogen inlet tube and a stirrer. After flushing the apparatus with nitrogen and while maintaining a slow stream of nitrogen the reaction is carried out as follows:

19.0 g. of 2-chloropropene (0.25 mole) is dissolved in 100 ml. of tetrahydrofuran and 5 ml. of this solution along with 0.5 ml. of ethyl bromide is added to the magnesium in the flask. After the reaction begins, the remainder of the 2-chloropropene solution is added at such a rate that the temperature is maintained at about 50° C. After addition is complete the mixture is heated at 50° C. for 0.75 hour and cooled to 0–10° C. to obtain a solution of 2-propenylmagnesium chloride.

By substituting the following alkenyl halides for the 2-chloropropene recited in the foregoing example the corresponding alkenyl magnesium halides of the said alkenes are prepared: 2-chloro-1-butene, 3-chloro-2-pentene, 2-chloro - 4,4,4 - trifluoro-1-butene, 2-chloro-2-pentene, 1-phenyl-1-bromoethylene, 1-cyclohexyl-1-chloroethylene, 3-phenyl-2-chloro-1-propene and 2-methyl-3-chloro-2-hexene.

*Example 2*

To the 2-propenylmagnesium chloride solution obtained in Example 1, 18.0 g. of (4-formylphenoxy)acetic acid (0.1 mole) in 50 ml. of tetrahydrofuran is added with stirring at such a rate as to maintain the temperature at 0–10° C. The mixture is stirred for an additional hour and then poured into 200 ml. of saturated ammonium chloride solution with stirring and cooling. The tetrahydrofuran layer is removed, dried over sodium sulfate and the tetrahydrofuran evaporated. The residue is distilled under reduced pressure and the product identified as [4-(1-hydroxy-2-methylenepropyl)phenoxy]acetic acid.

*Example 3*

The [4-(1-hydroxy-2-methylenepropyl)phenoxy]-acetic acid described in Example 2 may be prepared by the alternate method of substituting 2-propenyllithium for the 2-propenylmagnesium chloride employed in the foregoing example.

To a solution of 0.25 mole of 2-propenyllithium in ether, in an apparatus as used in the preparation using 2-propenylmagnesium chloride, 0.1 mole of (4-formylphenoxy)-acetic acid in ether is added in the manner there described at 0–5° C. After stirring for an additional hour, the mixture is poured into 200 ml. of saturated ammonium chloride solution with stirring and cooling. The tetrahydrofuran layer is removed, dried over sodium sulfate and the tetrahydrofuran evaporated. The residue is distilled under reduced pressure and identified as [4-(1-hydroxy-2-methylenepropyl)phenoxy]acetic acid.

*Example 4*

2.46 g. of orth-chloranil (0.01 mole) is dissolved in 182 ml. of chloroform and 2.2 g. of [4-(1-hydroxy-2-methylenepropyl)phenoxy]acetic acid (0.01 mole) is added. The mixture is kept in the dark for 16 hours. The reaction mixture then is passed through a short column of alumina and eluted with chloroform. The hydroquinone by-product remains in the column and the product is isolated by evaporation of the solution. The solid residue is crystallized from benzene to obtain [4 - (2-methylenepropionyl)phenoxy]acetic acid, M.P. 124.5–126.5° C.

By substituting the appropriate nuclear substituted (4-formylphenoxy)acetic acid and alkenylmagnesium halide reactants for the (4-formylphenoxy)acetic acid and propenylmagnesium halide recited in Example 2 and following substantially the procedure described therein, the corresponding nuclear substituted [4-(1-hydroxy-2-methylenepropyl)phenoxy]acetic acid compounds are prepared and the said hydroxy derivatives are then converted to their corresponding [4-(2-methylenalkanoyl)phenoxy]-acetic acids by the process described in Example 4. The following equation depicts these reactions and Table I which follows exemplifies the products produced thereby:

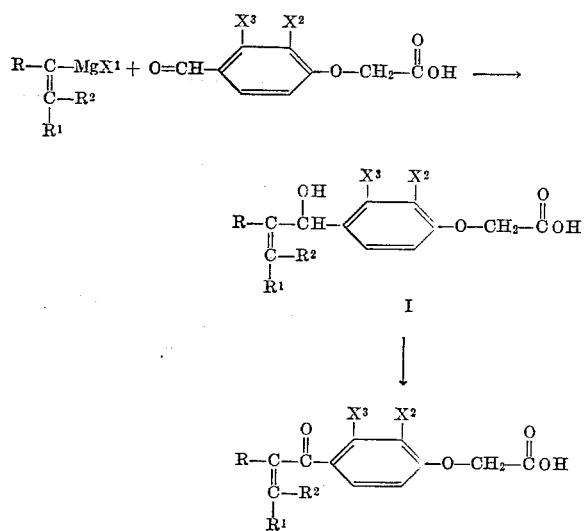

TABLE I

| Ex. | R | R¹ | R² | X¹ | X² | X³ | Product II M.P., °C. |
|---|---|---|---|---|---|---|---|
| 5 | H₅C₂— | H | H | Cl | H | Cl | 109–111 |
| 6 | H₅C₂— | H | H | Cl | Cl | Cl | 124.5–125.5 |
| 7 | H₅C₂— | H | H | Cl | CH₃ | CH₃ | 83.5–84.5 |
| 8 | H₅C₂— | CH₃ | H | Cl | Cl | Cl | 124.5–125.5 |
| 9 | H₅C₂— | H | H | Cl | —CH=CH—CH=CH— | | 106–109 |
| 10 | H₅C₂— | H | H | Cl | CH₃ | Cl | 113–114 |
| 11 | H₅C₂— | H | H | Cl | Cl | CH₃ | 89–91 |
| 12 | F₃C—CH₂— | H | H | Cl | CH₃ | CH₃ | 82–84 |
| 13 | H₅C₂— | CH₃ | CH₃ | Br | H | Cl | 95–97 |

The examples are exemplary only and the invention is not to be construed as being limited thereto. One skilled in the art will readily appreciate that by substituting the appropriate reactants for those recited in the foregoing examples all of the products embraced by the process of the invention may be prepared.

What is claimed is:

1. A process for preparing a compound of the formula

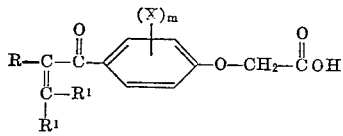

where R is a member selected from the group consisting of hydrogen, lower alkyl, trifluoromethyl substituted lower alkyl, cycloalkyl,

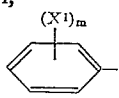

wherein X¹ is a member selected from the group consisting of hydrogen, halogen, lower alkyl and lower alkoxy and

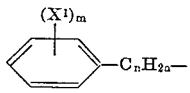

wherein X¹ is a defined above, R¹ is a member selected from the group consisting of hydrogen and lower alkyl, X is a member selected from the group consisting of hydrogen, halogen, lower alkyl, lower alkoxy and taken together two of the X radicals on adjacent carbon atoms of the benzene nucleus are joined to form an hydrocarbylene chain containing from 3–4 carbon atoms, $m$, in each occurrence, is an integer having a value of 1–4 and $n$ is an integer having a value of 1–5, which comprises the reaction of a compound of the formula

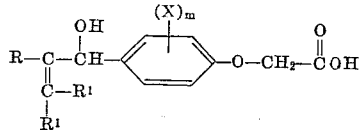

wherein R, R¹, X and $m$ are as defined above, with ortho-chloranil.

2. A process for preparing a compound of the formula

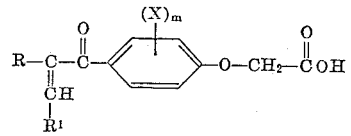

where R is a member selected from the group consisting of lower alkyl, and trihalomethyl substituted lower alkyl, R¹ is a member selected from the group consisting of hydrogen and lower alkyl, X is a member selected from the group consisting of hydrogen, halogen, lower alkyl, and taken together two X radicals on adjacent carbon atoms of the benzene ring may be combined to form a 1,3-butadienylene chain, and $m$ is an integer having a value of 1–2, which comprises the reaction of a compound of the formula

wherein R, R¹, X and $m$ are as defined above, with ortho-chloranil.

3. A process for preparing [4-(2-methylenepropionyl)phenoxy]acetic acid which comprises the reaction of [4 - (1 - hydroxy-2-methylenepropyl)phenoxy]acetic acid with ortho-chloranil.

4. A process for preparing [3-chloro-4-(2-methylenebutyryl)phenoxy]acetic acid which comprises the reaction of [3 - chloro - 4-(1-hydroxy-2-methylenebutyl)phenoxy]acetic acid with ortho-chloranil.

5. A process for preparing [2,3-dichloro-4-(2-methylenebutyryl)phenoxy]acetic acid which comprises the reaction of [2,3 - dichloro - 4-(1-hydroxy-2-methylenebutyl)phenoxy]acetic acid with ortho-chloranil.

6. A process for preparing [2,3-dimethyl-4-(2-methylenebutyryl)phenoxy]acetic acid which comprises the reaction of [2,3 - dimethyl - 4-(1-hydroxy-2-methylenebutyl)phenoxy]acetic acid with ortho-chloranil.

7. A process for preparing [2,3-dichloro-4-(2-ethylidenebutyryl)phenoxy]acetic acid which comprises the reaction of [2,3-dichloro-4-(1-hydroxy-2-ethylidenebutyl)phenoxy]acetic acid with ortho-chloranil.

8. A process for preparing [4-(2-methylenebutyryl)-1-naphthyloxy]acetic acid which comprises the reaction of [4 - (1-hydroxy-2-methylenebutyl)-1-naphthyloxy]-acetic acid with ortho-chloranil.

9. A process for preparing [2-methyl-3-chloro-4-(2-methylenebutyryl)phenoxy]acetic acid which comprises the reaction of [2-methyl-3-chloro-4-(1-hydroxy-2-methylenebutyl)phenoxy]acetic acid with ortho-chloranil.

10. A process for preparing [2-chloro-3-methyl-4-(2-methylenebutyryl)phenoxy]acetic acid which comprises the reaction of [2 - chloro - 3-methyl-4-(1-hydroxy-2-methylenebutyl)phenoxy]acetic acid with ortho-chloranil.

11. A process for preparing [2,3-dimethyl-4-(2-methylene - 3 - trifluoromethylpropionyl)phenoxy]acetic acid which comprises the reaction of [2,3-dimethyl-4-(1 - hydroxy - 2 - methylene-3-trifluoromethylpropyl)-phenoxy]acetic acid with ortho-chloranil.

12. A process for preparing [3-chloro-4-(2-isopropylidenebutyryl)phenoxy]acetic acid which comprises the reaction of [3 - chloro-4-(1-hydroxy-2-isopropylbutyl)-phenoxy]acetic acid with ortho-chloranil.

References Cited by the Examiner
UNITED STATES PATENTS

| | | | |
|---|---|---|---|
| 1,999,196 | 4/1935 | Lazier | 260—596 |
| 2,455,631 | 12/1948 | Weinkauff | 260—596 |

FOREIGN PATENTS 628,039    9/1961    Canada.

OTHER REFERENCES

Bowden et al.: J. Chemical Society (1946), pages 39–45.

LORRAINE A. WEINBERGER, *Primary Examiner.*

S. B. WILLIAMS, JR., *Assistant Examiner.*